(Model.)

H. BARRETT & J. J. VARLEY.
THIMBLE FOR CASINGS OF SCREW STOPPERS.

No. 384,013. Patented June 5, 1888.

UNITED STATES PATENT OFFICE.

HENRY BARRETT AND JOHN J. VARLEY, OF LONDON, ENGLAND.

THIMBLE FOR CASINGS OF SCREW-STOPPERS.

SPECIFICATION forming part of Letters Patent No. 384,013, dated June 5, 1888.

Application filed December 17, 1886. Serial No. 221,860. (Model.)

*To all whom it may concern:*

Be it known that we, HENRY BARRETT and JOHN JAMES VARLEY, subjects of the Queen of Great Britain, residing at London, England, have invented new and useful improvements in or connected with the manufacture of thimbles for forming casings of screw-stoppers for bottles, of which the following is a specification.

This invention relates to an improved thimble or outer covering or casing to serve for the purpose of a screw-threaded shell or thimble for stoppers.

In manufacturing compound screw-stoppers of vulcanite and a plastic material—such as lionite—a tube of vulcanite was employed, which tube or thimble (previously heated) was placed in a heated mold and the plastic material was forced or pressed into the tube, so as to force the tube to take the shape of the mold. We have found in practice that this method of manufacture is in some respects attended with disadvantages, as, owing to the property peculiar to vulcanite, the vulcanite tube or casing of the stopper is liable when subjected to the action of the heat to reacquire its former shape, thereby rendering in such case the stopper useless. To obviate this defect it has been found advantageous to employ screwed tubes or thimbles, which are prepared by being made of vulcanite in the required form—that is, threaded—and into which the plastic material intended to form the body or stem is pressed or forced so as to complete the stopper; but this mode of manufacture is costly.

Our present invention consists in an improved thimble of partly-cured material suitable for forming casings for the bodies of stoppers of the kind in question capable of being produced in a better and much more economical manner than hitherto, as hereinafter more particularly described, reference being had to the accompanying drawings.

Figure 2:
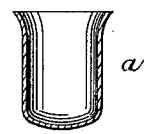
Figure 3:
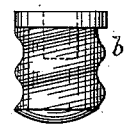
Figure 5:
Figure 4:
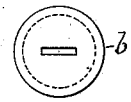

One of my plain thimbles in the "dough" state is shown at *a* and in section in Figure 2. *b*, Figs. 3, 4, and 5, illustrates the screw-shaped core, on which the thimble *a*, after first being vulcanized sufficiently to become elastic, is placed, in order that it may be made to assume the threaded shape of the core, as shown in Fig. 5.

Figure 1:

In carrying out our invention we first mold a number of plain thimbles or short tubes closed at one end from material or dough such as is used in the manufacture of vulcanite. One of such thimbles (marked *a*) is shown in elevation and section, respectively, at Figs. 1 and 2 of the drawings. These thimbles are then partly "cured"—that is to say, submitted to the treatment usually termed "vulcanizing treatment," until the thimbles become elastic, somewhat similar to vulcanized india-rubber. We employ a number of shaped cores of the required size and shape of the screwed stems or bodies of the stoppers to be manufactured. One of such screw-shaped cores is shown in elevation at Fig. 3 and in plan at Fig. 4 of the drawings, and is marked *b*. These cores are made of earthenware or porcelain or metal or other suitable heat-resisting material. In practice we have found that they may be very advantageously made of glazed porcelain or earthenware, as such material is cheap, and the glazed surface allows the thimbles to be easily placed thereon and removed therefrom, as hereinafter described, and is very suitable for withstanding the heat to which the thimbles have to be submitted when the vulcanizing process is being completed.

The thimbles or casings, made as hereinbefore described, are placed on the screw-shaped cores, and such tubes being elastic and having an internal diameter somewhat less than the diameter of the cores taken at the bottom of the thread, they will form or adapt themselves to and assume the shape of the cores—that is to say, the thimbles will take the shape of a hollow screw closed at the end. Fig. 5 of the drawings is an elevation of one of these cores with the thimble placed thereon. The cores with the thimbles thereon are then submitted to heat until the thimbles become converted into vulcanite in the well-known manner. The vulcanite thimbles thus formed can then be removed from the porcelain or other cores, and we thus produce in a simple and economical manner screwed thimbles or casings of vulcanite or like material suitable for being employed in the manufacture of compound stoppers of vulcanite and plastic material.

In manufacturing compound screw-stoppers of porcelain (or like heat-resisting material) and vulcanite according to this invention we employ plain thimbles of partly-cured rubber, as above described, and stretch such thimbles on the screwed porcelain stopper-stems and then submit the stoppers to heat until the thimbles are converted into vulcanite. The stoppers are then complete.

Having now particularly described and ascertained the nature of our said invention and in what manner the same is to be performed, we declare that what we claim is—

An elastic thimble plain or unthreaded and closed at one end and composed of partly-cured material, such as is used in the manufacture of vulcanite, as and for the purpose set forth.

H. BARRETT.
J. J. VARLEY.

Witnesses:
G. T. REDFERN,
F. W. PRICE.